(12) United States Patent
O'Hare et al.

(10) Patent No.: US 11,033,133 B2
(45) Date of Patent: Jun. 15, 2021

(54) THERMAL TRAVEL CONTAINER FOR USE WITH OR WITHOUT DISPOSABLE CUPS

(71) Applicants: Michael J. O'Hare, Ridgefield, CT (US); Steven S. Moon, Valencia, CA (US)

(72) Inventors: Michael J. O'Hare, Ridgefield, CT (US); Steven S. Moon, Valencia, CA (US)

(*) Notice: Subject to any disclaimer, the term of this patent is extended or adjusted under 35 U.S.C. 154(b) by 84 days.

(21) Appl. No.: 16/404,589

(22) Filed: May 6, 2019

(65) Prior Publication Data
US 2019/0374054 A1 Dec. 12, 2019

Related U.S. Application Data

(60) Provisional application No. 62/667,385, filed on May 4, 2018.

(51) Int. Cl.
| | |
|---|---|
| A47G 23/02 | (2006.01) |
| B65D 81/38 | (2006.01) |
| B65D 5/44 | (2006.01) |
| A47G 19/22 | (2006.01) |
| A47J 41/02 | (2006.01) |
| B65D 47/08 | (2006.01) |
| A47J 41/00 | (2006.01) |
| B60N 3/10 | (2006.01) |

(52) U.S. Cl.
CPC ..... *A47G 19/2288* (2013.01); *A47G 19/2272* (2013.01); *A47J 41/0088* (2013.01); *A47J 41/022* (2013.01); *B65D 47/08* (2013.01); *A47G 23/0216* (2013.01); *B60N 3/103* (2013.01); *B65D 2543/00046* (2013.01)

(58) Field of Classification Search
CPC ............ A47G 19/2288; A47G 19/2272; A47G 19/127; A47G 23/02; A47G 23/04; A47G 2023/0283; A47G 23/0216; A47G 23/0266; A47J 41/0088; A47J 41/022; A47J 41/00; A47J 41/02; A47J 41/0077; B65D 47/08; B65D 2543/00046; B65D 81/3841; B65D 81/3881; B65D 81/3865; B65D 47/06; B65D 51/2807; A45C 2200/20; B60N 3/103
USPC ................. 206/446, 521; 215/386, 395–400; 220/592.17, 737, 738, 739, 740, 23.87
See application file for complete search history.

(56) References Cited

U.S. PATENT DOCUMENTS

| | | | | |
|---|---|---|---|---|
| 615,460 | A * | 12/1898 | Parker ................ | A47G 23/0241 215/395 |
| 1,486,450 | A * | 3/1924 | Peterman ............. | A47J 41/0011 215/12.1 |
| 1,721,311 | A * | 7/1929 | Muenchen ................ | F25D 5/02 215/12.1 |

(Continued)

*Primary Examiner* — Gideon R Weinerth
(74) *Attorney, Agent, or Firm* — West & Associates, A PC; Stuart J. West; Charlotte Rodeen-Dickert

(57) ABSTRACT

A configurable beverage container that insulates a disposable lidded cup (which can be of varying sizes) while a user drinks from it while travelling. A user can then remove a disposable cup for increased beverage portability while leaving the insulated portion in a desired location. Similarly, if a person chooses to drink the beverage more slowly the container will assist in maintaining the desired temperature of the beverage for a longer period of time.

11 Claims, 9 Drawing Sheets

(56) References Cited

U.S. PATENT DOCUMENTS

| | | | | |
|---|---|---|---|---|
| 4,928,848 | A * | 5/1990 | Ballway | A47G 19/2205 |
| | | | | 215/12.1 |
| 5,040,719 | A * | 8/1991 | Ballway | A47G 23/03 |
| | | | | 220/738 |
| 5,316,146 | A * | 5/1994 | Graff | B01L 9/06 |
| | | | | 206/438 |
| 7,392,761 | B2 * | 7/2008 | Kujawa | A01K 7/00 |
| | | | | 119/61.5 |
| 9,360,248 | B1 * | 6/2016 | Efferding | B65D 69/00 |
| 9,930,982 | B2 * | 4/2018 | Matsui | A47G 23/0233 |
| 10,279,721 | B1 * | 5/2019 | Nelson | B65D 81/3881 |
| 2006/0169860 | A1 * | 8/2006 | Altheimer | A47G 23/0216 |
| | | | | 248/311.2 |
| 2008/0006643 | A1 * | 1/2008 | Ma | A47J 41/0011 |
| | | | | 220/592.16 |
| 2009/0266737 | A1 * | 10/2009 | Cole | A47G 19/2272 |
| | | | | 206/499 |
| 2012/0091131 | A1 * | 4/2012 | Arjomand | B65D 21/0228 |
| | | | | 220/4.01 |
| 2016/0022074 | A1 * | 1/2016 | Martin | A47G 23/0266 |
| | | | | 206/515 |
| 2016/0220049 | A1 * | 8/2016 | Joebges | A47G 19/2222 |
| 2017/0027350 | A1 * | 2/2017 | Onza | B65D 47/265 |
| 2017/0119186 | A1 * | 5/2017 | Rivera | B65D 81/3881 |
| 2017/0166385 | A1 * | 6/2017 | Pisarevsky | A47G 23/0241 |
| 2017/0273483 | A1 * | 9/2017 | McArthur | B65D 43/0212 |
| 2019/0337705 | A1 * | 11/2019 | McGee | B65D 83/0038 |
| 2019/0382187 | A1 * | 12/2019 | Callinan | B65D 47/286 |
| 2020/0255206 | A1 * | 8/2020 | Freedman | B65D 43/162 |

* cited by examiner

THERMAL TRAVEL CONTAINER FOR USE WITH OR WITHOUT DISPOSABLE CUPS

CROSS-REFERENCE TO RELATED APPLICATION(S)

This application claims the benefit of priority of U.S. Provisional Application 62/667,385 filed May 4, 2018, the complete contents of which is hereby incorporated herein by reference.

BACKGROUND

Technical Field

The present device relates generally to the field of insulated containers and more specifically to an insulated container that can be used with or without a disposable cup contained within it.

Background

Many commuters driving from their homes to a nearby train or bus station to travel to work each morning wish to drink hot coffee on the train or bus ride. To-go cups can be used to accommodate this activity. However, some commuters do not carry briefcases or other work bags, and, therefore cannot easily bring home a to-go cup that could be used for the next morning's commute. As a result, in order to drink a cup of coffee on the train or bus a person would need to have a disposable cup of coffee available prior to boarding. The most economical way to handle this would be to buy disposable cups, pour at home, then take the cups to the train or bus station. Other possibilities are to stop by a store on the way or maybe find a cup at a coffee shop at the station. The option of making coffee at home takes less time, would be relatively less expensive, and create a time benefit by eliminating an extra stop in the morning.

If coffee is made at home and carried along to a train station (door-to-door), the time elapsed in driving, parking, and waiting would be likely at least 20-30 minutes. As a result, the coffee would have significantly cooled by the time a person arrived on the train and settled in to enjoy it. The person would then have to hurry to drink it before it lost all its warmth.

What is needed is a system and method that allows a user to acquire a warm beverage (either made at home or purchased elsewhere) in a disposable cup and contain the disposable cup within an insulated container while still allowing the user to drink from the disposable cup without requiring the user to remove the disposable cup from the insulated container. However, such a system can also allow a user to utilize the insulated container in the absence of a disposable cup.

SUMMARY

Transporting a hot beverage, such as coffee, for more than a few minutes can result in significant cooling of the beverage along the way. Commuters who do not use a briefcase or work bag do not have a place to store a reusable cup in which to carry back home. The present device comprises a disposable cup in a reusable insulated carrier. When a user reaches a destination, the disposable cup can be removed from the carrier, which can be left in a car. As a result, a person does not need to carry in-hand the insulated carrier to the workplace then all the way back home at the end of the day. Instead, the insulated carrier need only be carried from a car to a dwelling upon returning home.

Further, a user can also utilize the insulated container alone to hold a beverage in the absence of a disposable cup. If a user drinks coffee or a hot beverage more slowly, it can remain hot with use of this insulated carrier, which can save a user from having to reheat the drink or buy a replacement. Similarly, because the carrier/cup is insulated, cold beverages can remain at lower temperatures longer. For more casual use, the bottom of the carrier alone can be used as a mug or to hold a disposable cup. This serves to keep a beverage hotter/colder than a non-insulated cup and also keep the higher/lower temperatures away from one's bare hand.

BRIEF DESCRIPTION OF THE DRAWINGS

Further details of the present invention are explained with the help of the attached drawings in which:

FIG. 1b depicts an interior cross-sectional view of the embodiment shown in FIG. 1a.

FIG. 2b depicts an exploded interior cross-sectional view of the embodiment shown in FIG. 2a.

FIG. 3b depicts a detail exploded interior cross-sectional view of the embodiment shown in FIG. 3a.

FIG. 5b depicts an interior cross-sectional view of the embodiment shown in FIG. 5a.

FIG. 7b depicts an interior cross-sectional view of the embodiment shown in FIG. 7a.

FIG. 7d depicts a detail cross-sectional side view of the embodiment shown in FIG. 7a.

DETAILED DESCRIPTION

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Figure 1A:
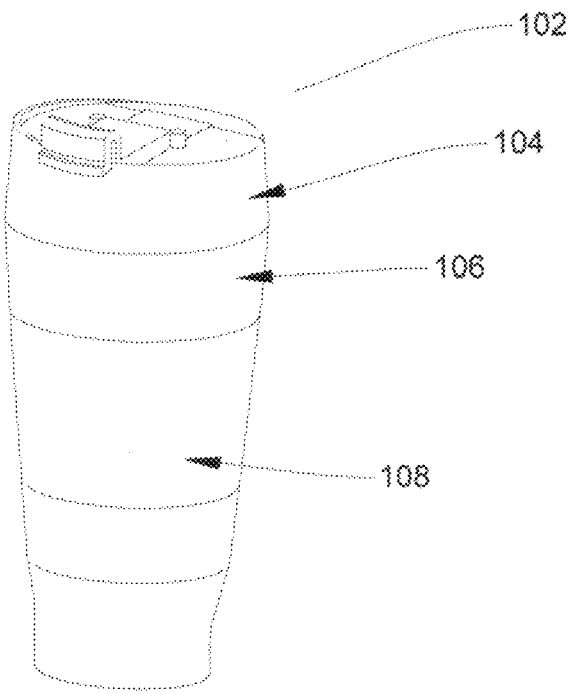
FIG. 1a depicts an exterior perspective view of an embodiment of the present device.

FIG. 1a depicts an exterior perspective view of an embodiment of the present device. An insulated beverage container 102 can comprise a lid 104, an upper/exterior shell 106, and a lower/interior container 108. In some embodiments, the bottom portion of a lid 104 can selectively engage with the top portion of an upper/exterior shell 106, and the bottom portion of an upper/exterior shell 106 can selectively engage with a lower/interior container 108. Selective engagement between an upper/exterior shell with a lid 104 and a lower/interior container 108 can be via a threaded connection, friction-fit, or any other known, convenient and/or desired engagement mechanism can be used.

In the embodiment shown in FIG. 1a, an upper/exterior shell 106 can overlap a lower/interior container 108 approximately in the selective engagement regions. However, in other embodiments, an upper/exterior shell 106 can extend at least partially downward substantially along the exterior surface of a lower/interior container 108. In such embodiments, an upper/exterior shell 106 can provide an additional layer of insulation and protection to a lower/interior container 108.

A lower/interior container 108 can be an insulated container designed, configured and adapted to act as a thermal barrier. In some embodiments the thermal barrier can be created by an air gap between one or more layers. However, in alternate embodiments a thermal barrier can be created using any known, convenient and/or desired fabrication technique and/or material or materials.

In some embodiments, a lid 104, an upper/exterior shell 106, and a lower/interior container can be comprised of plastic, polymer, metal, or any other known and/or convenient materials. In some embodiments, components of an insulated beverage container 102 can be comprised of a single material, but in other embodiments can be comprised of different materials in any other known, convenient, and/or desired combination.

Figure 1B:
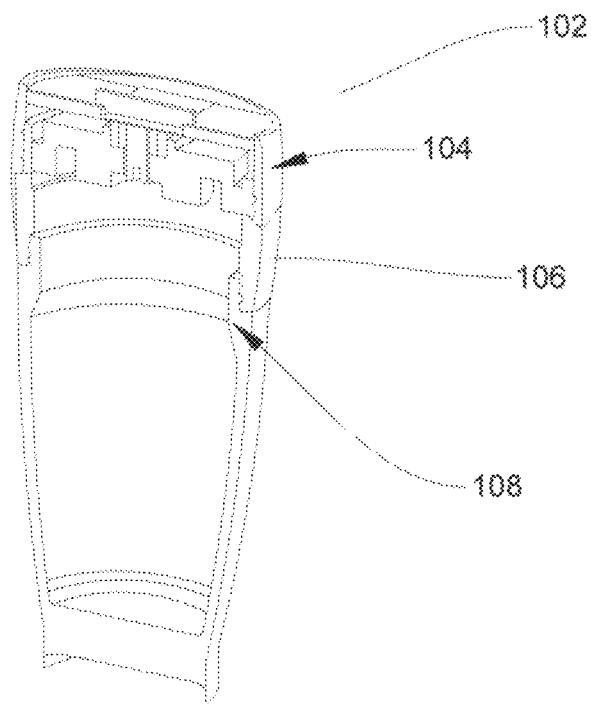

FIG. 1b depicts a cutaway interior view of the embodiment of the embodiment shown in FIG. 1a. As shown in FIG. 1b, the inner surface of the lower perimeter of a lid 104 can selectively engage with the outer surface of the top perimeter of an upper/outer shell 106 via a threaded connection, but in other embodiments can be in any other known and/or convenient orientation. Also as shown in FIG. 1b, the outer surface of the upper perimeter of a lower/interior container 108 can selectively engage with the inner surface of the bottom perimeter of an upper/outer shell 106 via a threaded connection, but in other embodiments can be in any other known and/or convenient orientation. In some embodiments, a lid 104, an upper/exterior shell 106, and a lower/interior container 108 can be removably connected to allow for convenient disassembly for cleaning.

Figure 2A:
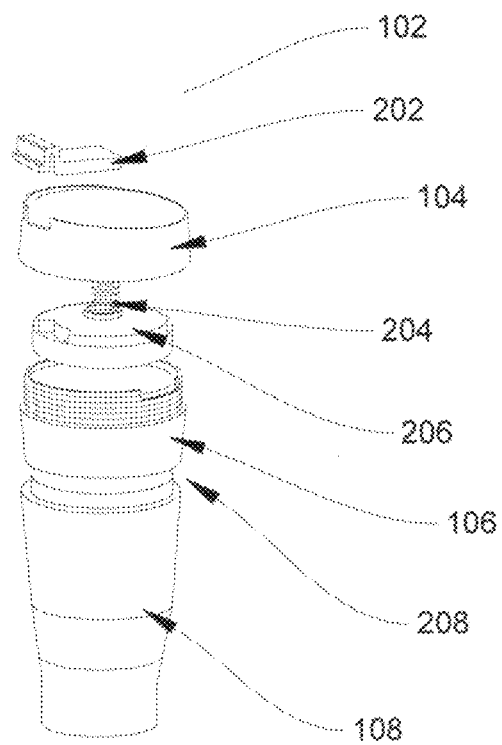
FIG. 2a depicts an exploded exterior perspective view of an embodiment of the present device.

FIG. 2a depicts an exploded assembly perspective exterior view of an embodiment of the present device. As shown in the embodiment of FIG. 2a, a lid 104 can further comprise a closure member 202 that can cover a drinking opening. In some embodiments, a closure member 202 can be a substantially planar flap connected to a lid 104 via a pivoting connection in a "flip-top" configuration. However, in other embodiments, a closure member 202 can be selectively engaged with a lid 104 in a sliding, rotating, or any other known and/or convenient opening and closing configuration.

As shown in FIG. 2a, a spring-biased member 204 and a spacer 206. In some embodiments, a spring biased member 204 can be a helical coil spring, leaf spring, compressible elastomeric solid, or any other known and/or convenient device comprised of metal, polymer, or any other known and/or convenient material. In some embodiments, a spacer 206 can be a solid, substantially planar member with a substantially circular geometry, but in other embodiments can have any other known and/or convenient configuration. In some embodiments a spacer 206 can have a substantially central opening to selectively engage a spring biased member 204. The lower surface of a spacer 206 can also have as additional indentations to selectively engage with a cup lid or rim, but in other embodiments can be substantially flat. In some embodiments, a spacer can be comprised of an elastomeric material, but in other embodiments can be comprised of metal, polymer, or any other known and/or convenient material. In embodiments where a spacer 206 is comprised of an elastomer material, a spacer 206 can conform to the lid of a cup 208 to increase surface contact between a spacer 206 and cup 208.

Figure 2B:
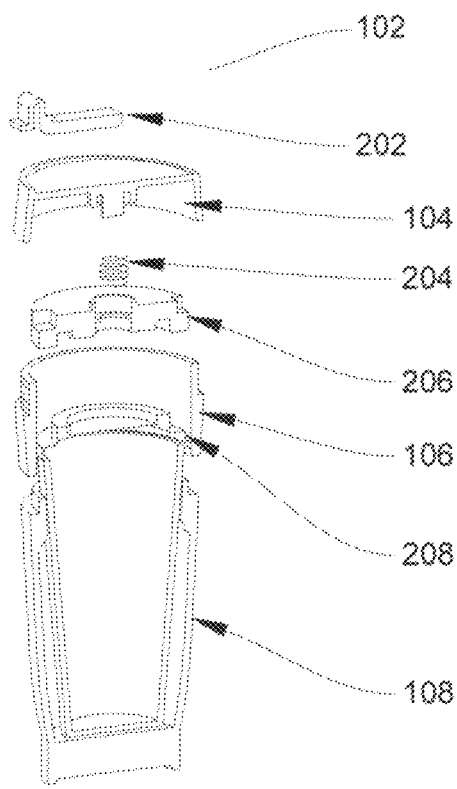

FIG. 2b depicts an exploded assembly cutaway interior view of the embodiment shown in FIG. 2a. As shown in FIG. 2b, a disposable cup (with lid) 208 can be positioned substantially adjacent to the inner surface of a lower/interior container 108. In some embodiments, a disposable cup 208 can be comprised of paper, polymer, or any other known and/or convenient material. As shown in FIG. 2b, a cup 208 can include a lid, but in other embodiments may only comprise a container component.

In some embodiments, as shown in FIG. 2b, a spring biased member 204 can be a helical coil spring having a first end a second end. In such embodiments, a first end of a spring biased member 204 can be removably coupled to a point substantially at the center of the lower surface of a lid 104 via a friction fit, adhesive, or any other known and/or convenient mechanism. In some embodiments, the lower surface of a lid 204 can have an additional protrusion and/or groove to selectively engage with the first send of a spring biased measure. A second end of a spring biased member 204 can be removably coupled to a point substantially at the center of the upper surface of a spacer 206 via a friction fit, adhesive, or any other known and/or convenient mechanism.

Figure 3A:
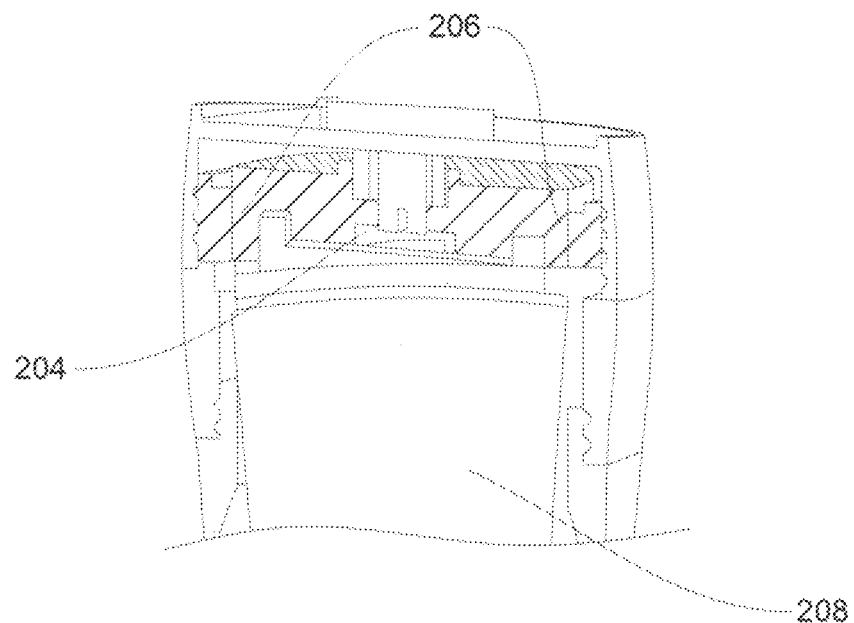
FIG. 3a depicts a detail interior cross-sectional view of an embodiment of the present device.

FIG. 3a depicts a detail cutaway interior view of the upper portion of an embodiment of the present device in a closed position. As shown in FIG. 3a, a spring biased member 204 can selectively engage with the lower surface of a lid 204 and the upper surface of a spacer 206. In a closed position, a spring biased member 204 can be compressed to exert a force substantially normal to the upper surface of a spacer 206, which can be transferred to the top of a cup 208. As shown in the embodiment of FIG. 3a, the lower surface a spacer 206 can have a geometry to selectively engage with the surface geometry of a cup 208 lid. In a closed position, a spring biased member 204 and a spacer 206 can hold a cup 208 in place in this embodiment of the present device.

Figure 3B:
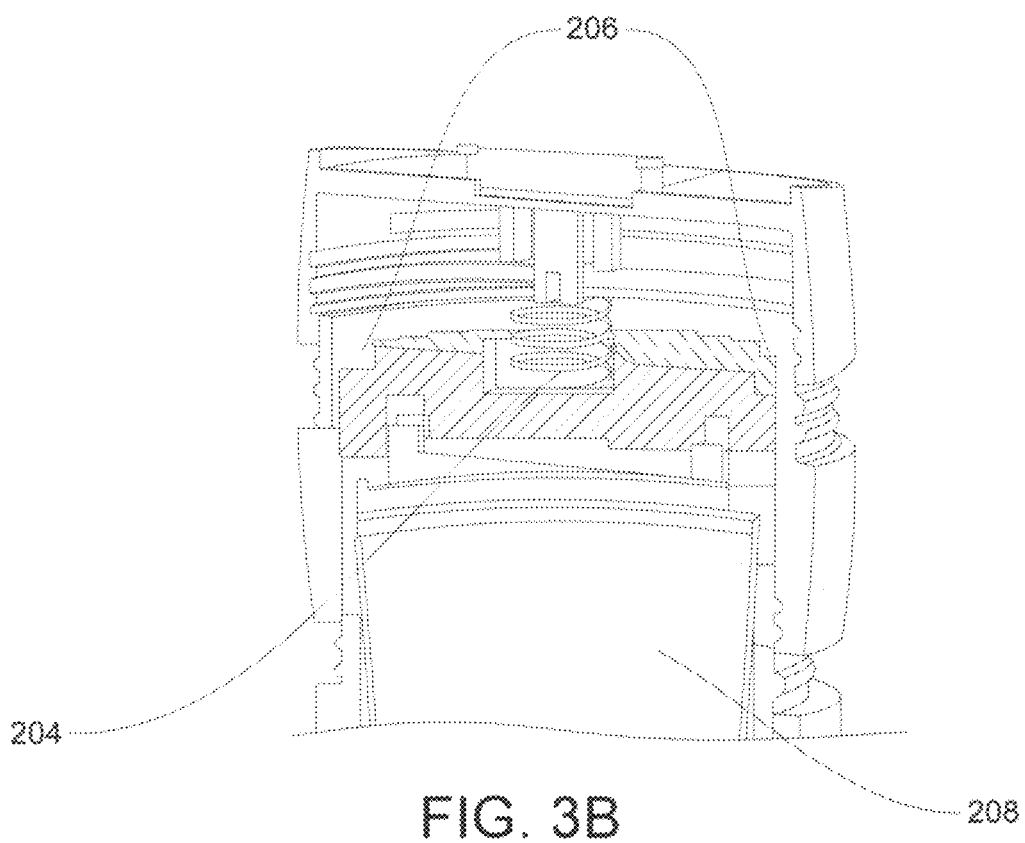

FIG. 3b depicts a detail cutaway interior view of the upper portion of an embodiment of the present device in an open position, wherein a lid 104, upper/exterior shell 106, and lower/interior container 108 are not fully engaged to create a closed position, as shown in FIG. 3a. In the position shown, a spring biased member 204 can be in a neutral or partially compressed configuration. A spacer 206 can be positioned above, but not in substantial contact with, the lid of a cup 208, as shown in FIG. 3b.

Figure 4A:
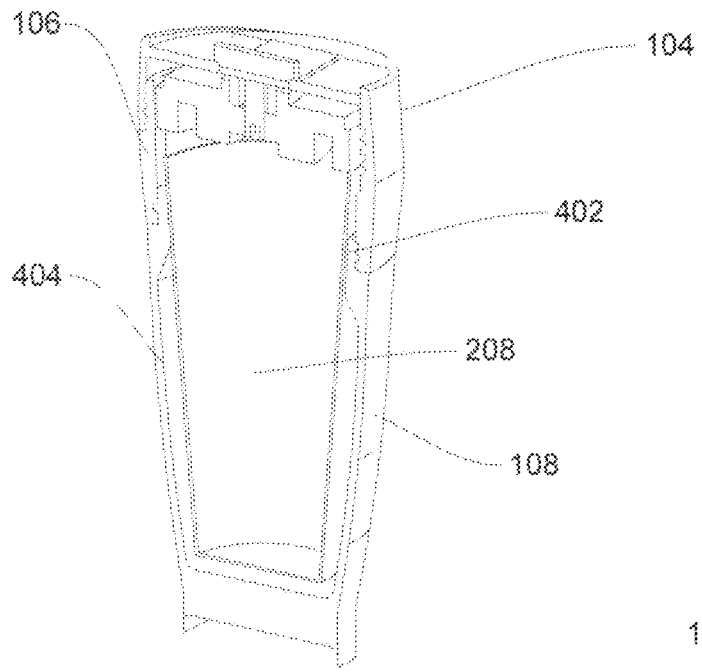
FIG. 4a-4c depict interior cross-sectional views of the embodiment shown in FIG. 1a with different size disposable containers.
Figure 4B:
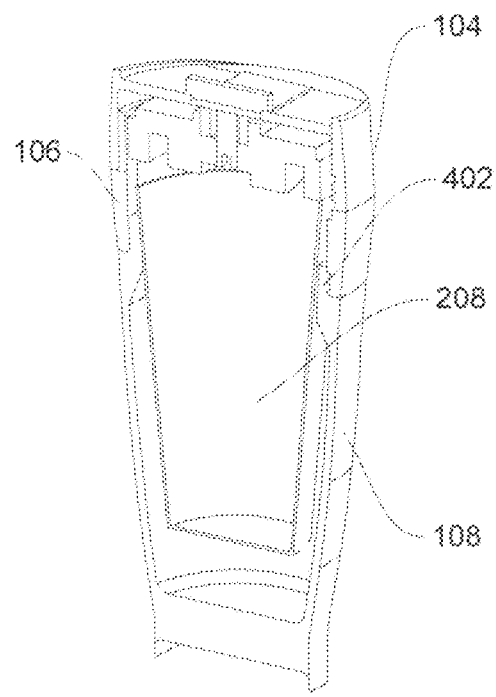
Figure 4C:
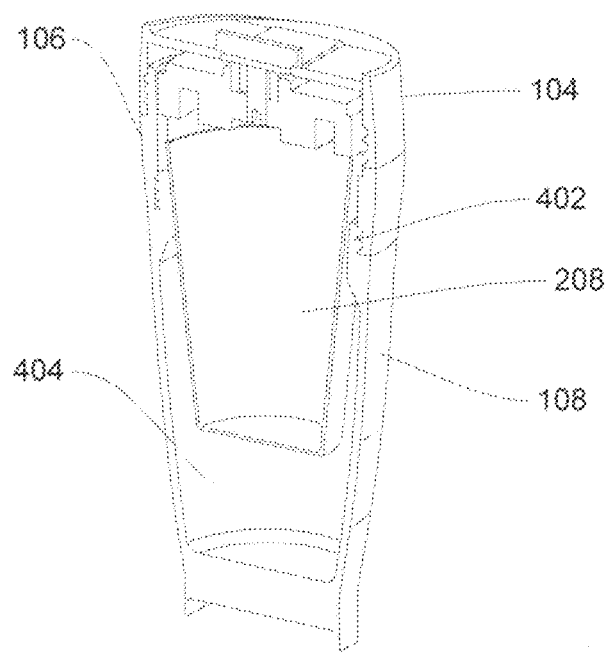

FIGS. 4a-4c depict interior cross-sectional views of an embodiment of the present device in use with different size cups 208. In the embodiments shown, a cup 208 can be tapered and dimensioned such that the sides of a cup 208 can rest substantially directly adjacent to the interior lip 402 of a lower/interior container 108. In some embodiments, an air gap 404 can be created that can enhance the thermal insulation performance of the device.

Figure 5A:
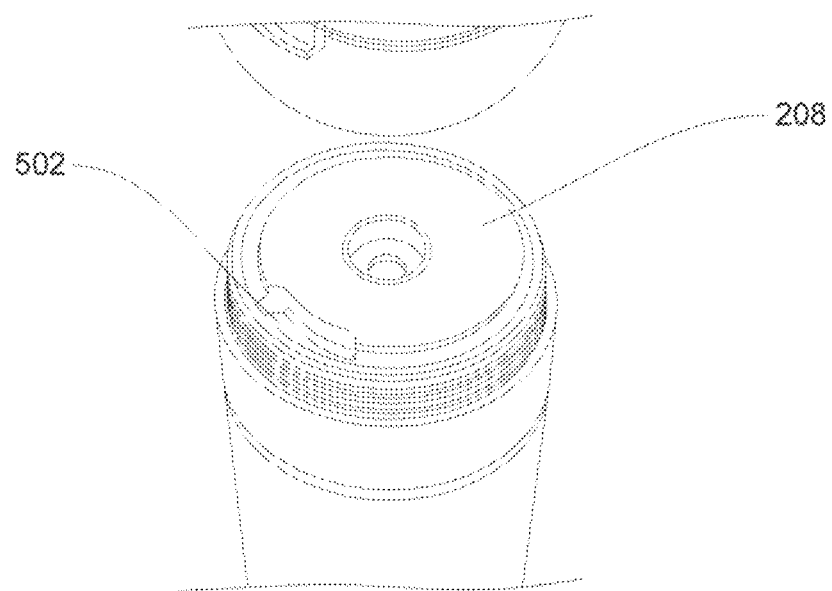
FIG. 5a depicts an exterior perspective view of an embodiment of the present device.

FIG. 5a depicts a detail perspective view of an embodiment of a spacer 206 in the present device. In some embodiments, the perimeter edge of a spacer 206 can have a notch 502 that can correspond in geometry to that of a drinking opening of a cup 208 to allow fluid communication from a cup 208.

Figure 5B:
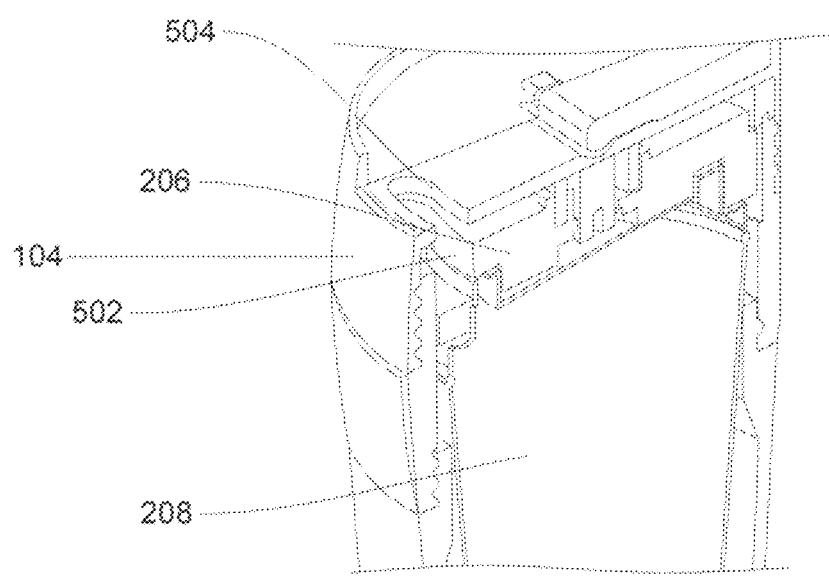

FIG. 5b depicts a detail cross-section of the embodiment shown in FIG. 5a. A notch 502 can also correspond to the geometry of an opening 504 in a lid 104. As shown in FIG. 5b, the opening of a cup 208, a notch 502, and a lid opening 504 can be substantially in alignment to allow a beverage to flow while preventing internal leakage. In some embodiments, a beverage can flow directly from the interior of a lower/interior container 108 out of an opening 504 in a lid 104. In such embodiments, a lid 104 can selectively engage with a lower/interior container via a threaded connection, friction fit, or any other known and/or convenient device. In such embodiments, an upper/exterior shell 106, spring biased member 204, and a spacer 206 can be removed from the device and replaced when the device is being used with a disposable cup 208.

Figure 6:
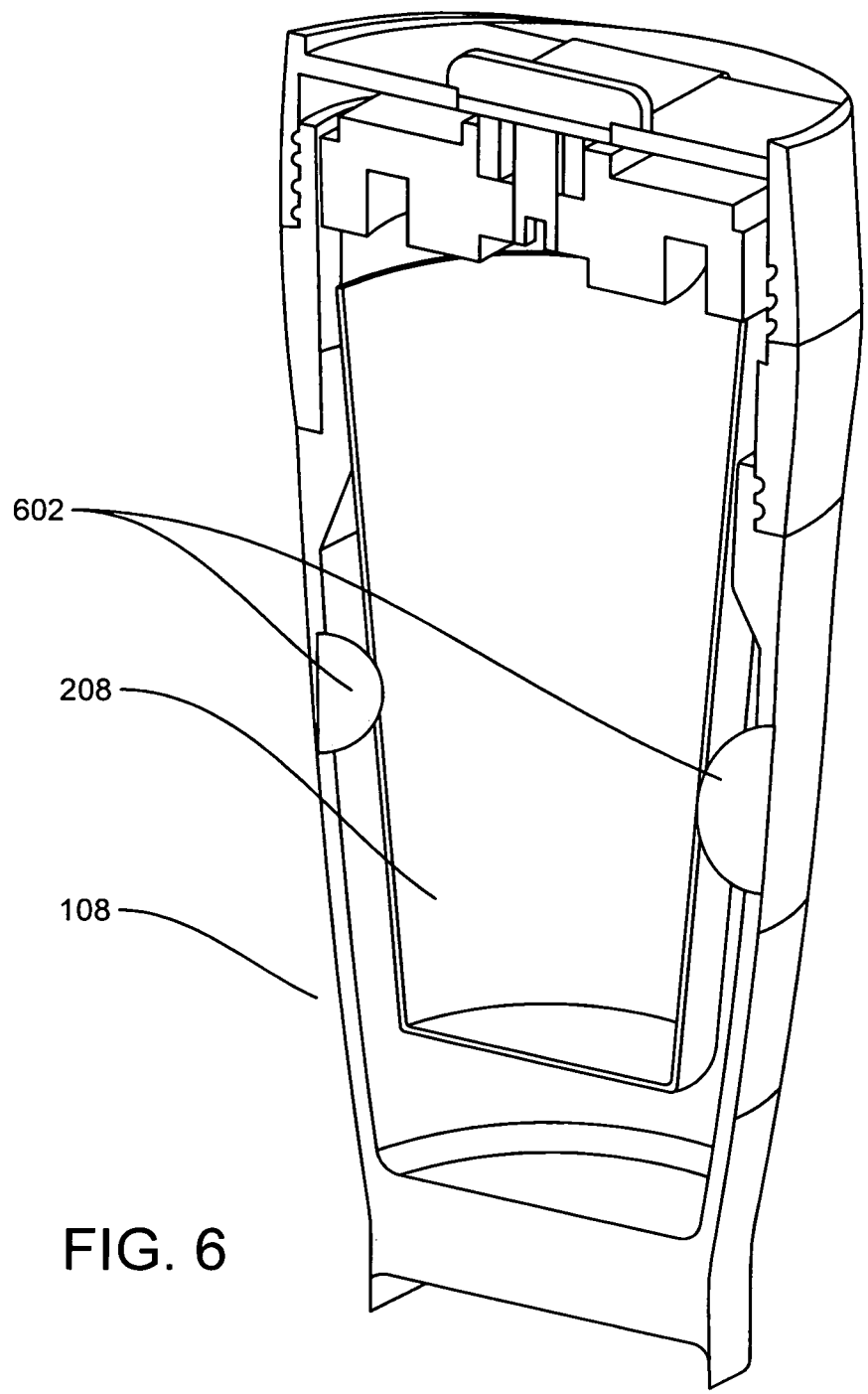
FIG. 6 depicts an alternative embodiment of the present device.

FIG. 6 depicts an alternate embodiment of the present device. In such embodiments, a lower/interior member 108 can have at least one protrusion 602 partially extending radially inward from a point on the interior surface of a lower/interior container 108. At least one protrusion 602 can extend substantially continuously in an annular configuration or any other known and/or convenient portion thereof. In such embodiments, external sides of a cup 208 can engage with at least one protrusion 602 to hold a cup 208 such that the lip of a cup 208 can be situated above the upper lip of a lower/interior container 108. In some embodiments, at least one protrusion 602 can be integrated with a lower/interior member 108, but in other embodiments can be a separate component that can be removably coupled with a lower/interior member 108, insert, or any other known and/or convenient configuration.

FIGS. 7a-e depict another embodiment of the present device. In the embodiment shown in FIG. 7a, an insulated beverage container 102 can further comprise an insert 702. In some embodiments, an insert 702 can be comprised of metal, polymer, or any other known and/or convenient material.

Figure 7A:
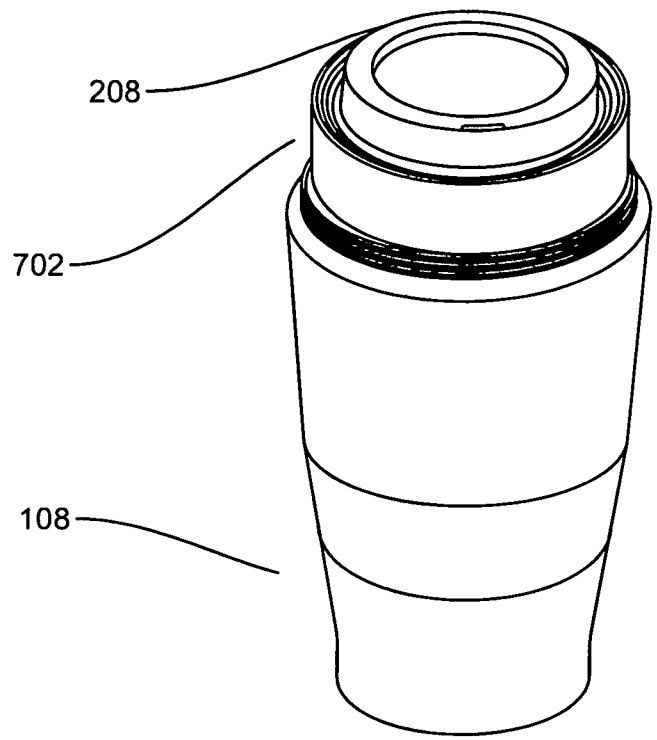
FIG. 7a depicts perspective view of another alternative embodiment of the present device.
Figure 7B:
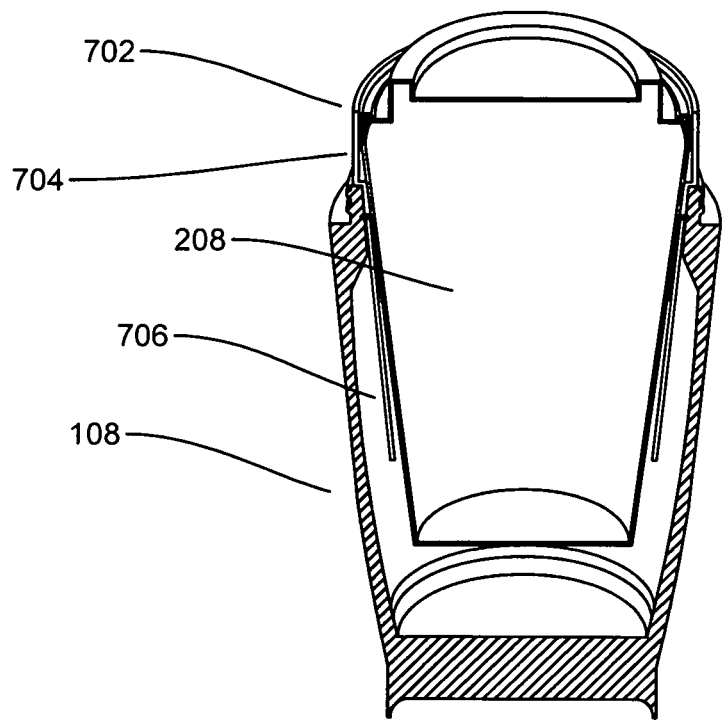

As shown in FIG. 7b, an insert 702 can comprise a collar member 704, which can be substantially cylindrical and have a diameter corresponding to that of the top rim of a disposable beverage cup 208. However, in other embodiments, a collar member 704 can have any other known and/or convenient geometrical configuration. A plurality of longitudinal members 706 can extend substantially orthogonally from the bottom edge of a collar member 704. In such embodiments, longitudinal members 706 can extend down into a lower/exterior container 108. In other embodiments, all or any other known and/or convenient portion of the perimeter of the lower edge of a collar member 704 can extend longitudinally.

Figure 7C:
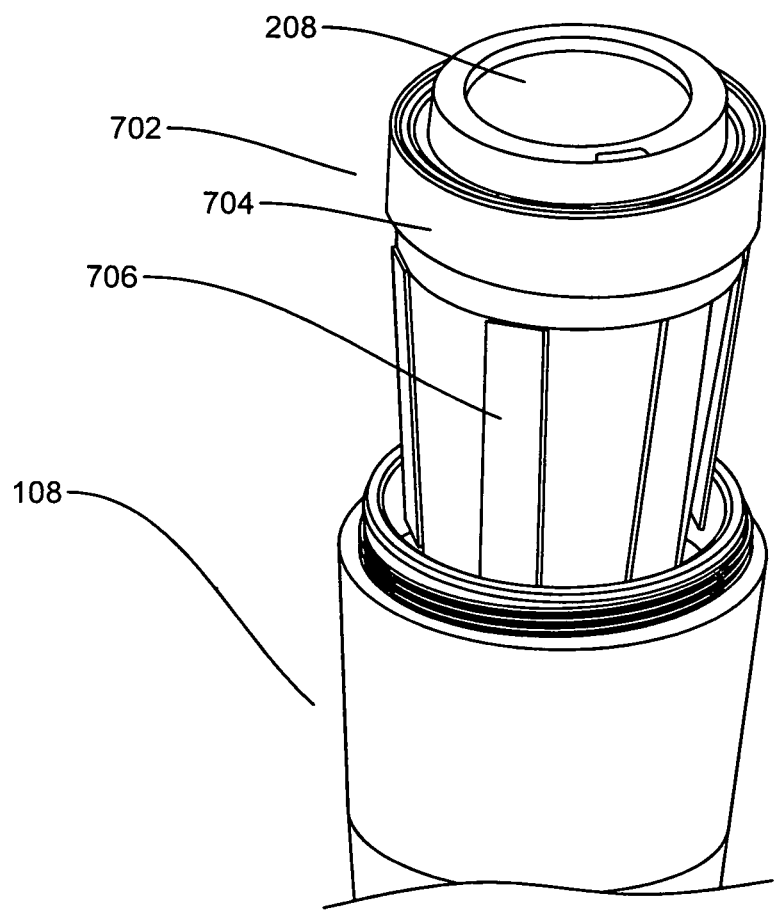
FIG. 7c depicts a perspective view of the embodiment shown in FIG. 7a with the components partially separated.

In the embodiment shown in FIG. 7c, a collar member 704 can comprise two or more cylinders of different diameter, such that the lower portion can have a diameter less than that of the upper portions. In some embodiments, a collar member 704 can have a tapered configuration. As shown in FIG. 7c, longitudinal members 706 can be substantially planar or have a substantially rectangular transverse cross-section, but in other embodiments can have a rounded or any other known and/or convenient transverse cross-sectional geometry.

Figure 7D:
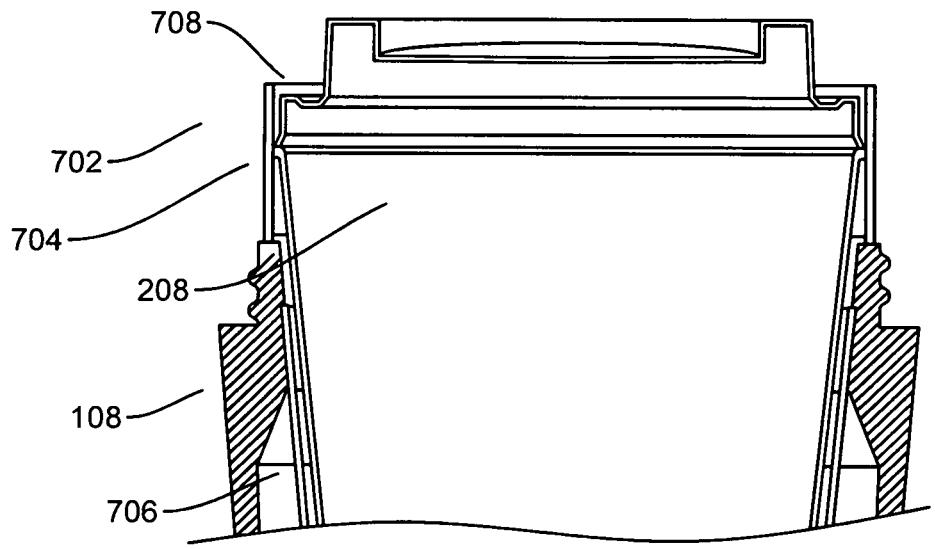

As shown in FIG. 7d, a collar member 704 can have a lip 708 that can extend substantially orthogonally and inward from the top edge of a collar member 704. In some embodiments, a lip 708 can extend over the outer perimeter of the lid of a disposable cup 208. A collar member 704 can surround the top section of a disposable cup 208, substantially around the connection region of a disposable cup 208 and its lid. In the embodiment of FIG. 7d, a collar member 704 having a lower section of lesser diameter can selectively engage with the top edge of a lower/interior container 108 such that the upper portion of a collar member 704 can rest on the upper edge of a lower/interior container 108. In such embodiments, a collar member 704 can be removably held in place by a friction fit, deformation, press fit, or any other known and/or convenient device. Longitudinal members 706 can extend down into a lower/interior container 108 adjacent to a disposable cup 208.

Figure 7E:
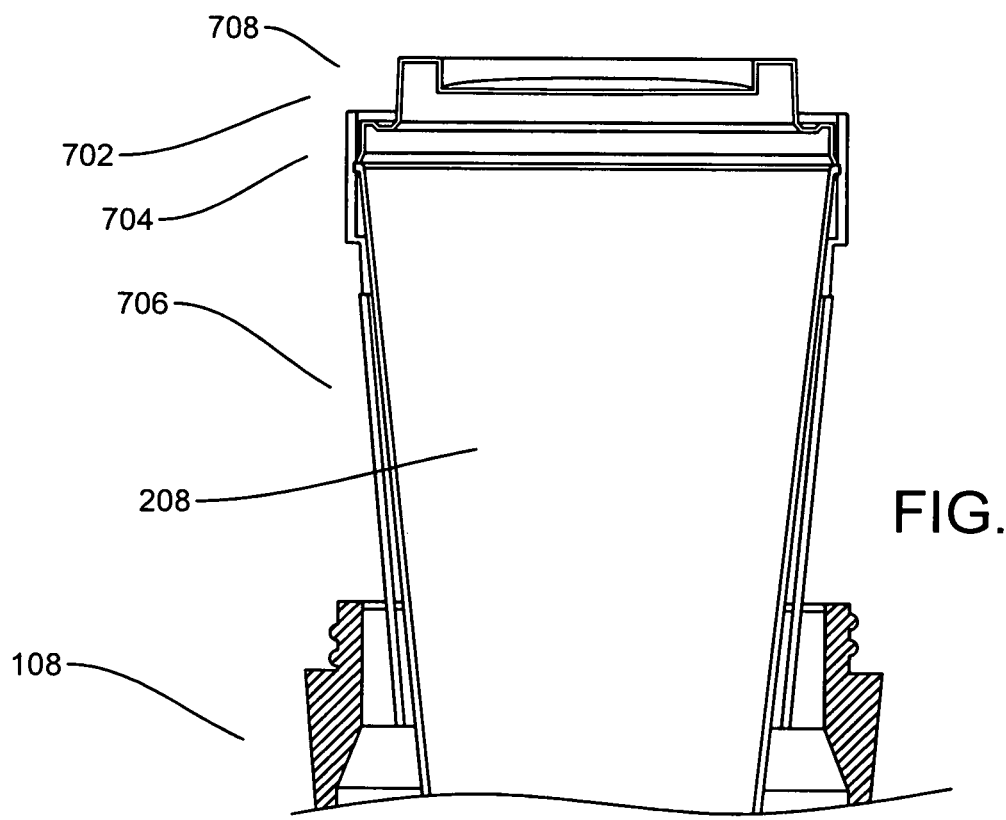
FIG. 7e depicts a detail cross-sectional side view of the embodiment shown in FIG. 7a with the components partially separated.

FIG. 7e depicts a side cross-sectional view of the embodiment of FIG. 7d, in which an insert 702 can be partially removed, e.g., as when removing or inserting a disposable cup 208.

In use, a user can place a cup 208 of a beverage, such as, but not limited to coffee, into a lower/interior container 108. As shown in FIGS. 4a-4c, a cup 208 can come to rest against the interior of a lower/interior container 108 such that the upper edge of a cup 108 can sit above the top edge of a lower/interior container 108. In alternate embodiments, as shown in FIG. 6, sides of a cup 208 can engage with at least one protrusion 602, such that the upper lip of a cup 208 can extend above the upper lip of a lower/interior container 108.

A spacer 206 can be placed directly adjacent to the top surface of the lid of a cup 208.

A lid 104 can be selectively engaged with an upper/exterior shell, causing a spring-biased member 204 to compress and exert a force against a cup 208 via a spacer 206. A closure member 202 can be placed in an "open" or "closed" position as desired by the user. A user can drink a beverage from a disposable cup 208 while situated in the device.

When desired, a user can then remove the disposable cup 208 to carry alone, without the device for increased portability. When the user has finished the beverage, a disposable cup 208 can be discarded. The device can then be reused to insulate another beverage in a disposable cup 208. In other embodiments, a user can put a beverage directly into a lower/interior container 108 without a disposable cup 208. In this embodiment, a user would carry the whole device like a standard insulated drinking device.

In other embodiments, a user can drink directly from a cup 208, with or without a disposable lid, while a cup 208 remains insulated in a lower/interior container 108. In such embodiments, as shown in FIGS. 7a-e, an insert 702 can be placed around a disposable cup 208 to hold it securely in place without the need for an upper/exterior shell 106 and a container lid 104.

These multiple configurations allow for several operations and selective thermal barriers for the contained beverage.

Although exemplary embodiments of the invention have been described in detail and in language specific to structural features and/or methodological acts above, it is to be understood that those skilled in the art will readily appreciate that many additional modifications are possible in the exemplary embodiments without materially departing from the novel teachings and advantages of the invention. Moreover, it is to be understood that the subject matter defined in the appended claims is not necessarily limited to the specific features or acts described above. Accordingly, these and all such modifications are intended to be included within the scope of this invention construed in breadth and scope in accordance with the appended claims.

What is claimed:

1. A user-configurable container comprising:
a lid having an upper and lower surface and a lid opening extending through the top and bottom surface of said lid;
a closure member located on the upper surface of said lid;
an upper/exterior shell;
a lower/interior container;
wherein said lid selectively engages said upper/exterior shell and said upper/exterior shell selectively engages at least a portion of said lower/interior container;
a spacer having an upper surface and a lower surface and a notch or other means along a portion of the perimeter of said spacer;
a spring biased member or other mechanism having a first end and a second end, wherein said first end is selectively engaged with the lower surface of said lid and said second end is selectively engaged with the upper surface of said spacer,
wherein said spring biased member exerts a force substantially normal to the upper surface of the spacer when compressed;
an insert having a collar with a top edge and a bottom edge; and
a plurality of longitudinal members extending substantially orthogonally from the bottom edge of said collar, and a lip extending inward from the top edge;
wherein said insert selectively and removably engages with the lower/interior container.

2. The container of claim 1, further comprising a disposable lidded cup with a drinking opening, wherein said spacer selectively engages with said disposable lidded cup and said drinking opening, said spacer notch or other means align with the drinking opening of said disposable lidded cup.

3. The container of claim 2, wherein said spring biased member is a helical coil spring or other mechanism.

4. The container of claim 3, wherein the lower surface of said lid further comprises a protrusion to selectively engage said spring biased member.

5. The container of claim 3, wherein the lower surface of said spacer is configured to have a geometry corresponding to an exterior of a disposable beverage lid.

6. The container of claim 1, further comprising a disposable cup that selectively engages with the collar of said insert such that a collar surrounds said cup.

7. A user-configurable container comprising:
a lid having an upper and lower surface and a lid opening extending through the top and bottom surface of said lid;
a closure member located on the upper surface of said lid;
an upper/exterior shell;
a lower/interior container;
wherein said lid selectively engages said upper/exterior shell and said upper/exterior shell selectively engages at least a portion of said lower/interior container;
a spacer having an upper surface and a lower surface and a notch or other means along a portion of the perimeter of said spacer;
a spring biased member or other mechanism having a first end and a second end, wherein said first end is selectively engaged with the lower surface of said lid and said second end is selectively engaged with the upper surface of said spacer, wherein said spring biased member exerts a force substantially normal to the upper surface of the spacer when compressed;
an insert having a collar with a top edge and a bottom edge; and
a disposable cup that selectively engages with the collar of said insert such that the collar surrounds the top region of said disposable cup.

8. The container of claim 7, wherein the disposable cup comprises a disposable lid with a drinking opening, wherein said spacer selectively engages with said disposable lid and said drinking opening, said spacer notch or other means align with the drinking opening of said disposable lid.

9. The container of claim 8, wherein said spring biased member is a helical coil spring or other mechanism.

10. The container of claim 9, wherein the lower surface of said lid further comprises a protrusion to selectively engage said spring biased member.

11. The container of claim 9, wherein the lower surface of the spacer is configured to have a geometry corresponding to the exterior of the disposable lid.

* * * * *